US009311951B1

(12) United States Patent  
Chu et al.

(10) Patent No.: US 9,311,951 B1  
(45) Date of Patent: Apr. 12, 2016

(54) LASER ADJUSTMENT DURING FIELD OPERATION OF A HEAT-ASSISTED MAGNETIC RECORDING DATA STORAGE DEVICE

(71) Applicant: Seagate Technology LLC, Cupertino, CA (US)

(72) Inventors: Alfredo Sam Chu, Prior Lake, MN (US); Drew Michael Mader, Bloomington, MN (US); Wenzhong Zhu, Apple Valley, MN (US); Michael A. Cordle, Eagan, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/864,202

(22) Filed: Sep. 24, 2015

(51) Int. Cl.
| | |
|---|---|
| *G11B 7/1263* | (2012.01) |
| *G11B 20/18* | (2006.01) |
| *G11B 5/02* | (2006.01) |
| *G11B 7/1267* | (2012.01) |
| *G11B 5/00* | (2006.01) |
| *G11B 5/455* | (2006.01) |
| *G11B 5/012* | (2006.01) |

(52) U.S. Cl.
CPC ............... *G11B 7/1263* (2013.01); *G11B 5/02* (2013.01); *G11B 7/1267* (2013.01); *G11B 20/1816* (2013.01); *G11B 5/012* (2013.01); *G11B 5/455* (2013.01); *G11B 2005/0021* (2013.01)

(58) Field of Classification Search
CPC .................. G11B 20/10305; G11B 20/10027; G11B 20/10481; G11B 5/455; G11B 7/1267; G11B 5/012; G11B 7/1263; G11B 2005/0021; G11B 5/4866; G11B 20/1816; G11B 5/02

USPC .......... 369/13.13, 13.27, 13.33, 13.32, 13.24, 369/13.03, 13.26, 13.01
See application file for complete search history.

(56) References Cited

U.S. PATENT DOCUMENTS

| | | | |
|---|---|---|---|
| 6,957,379 B1 | 10/2005 | Patapoutian et al. | |
| 7,102,838 B2 | 9/2006 | Kim et al. | |
| 8,477,569 B2* | 7/2013 | Erden | G11B 5/02 369/13.01 |
| 8,797,672 B2 | 8/2014 | Tanabe et al. | |
| 8,854,929 B1 | 10/2014 | Champion et al. | |
| 9,153,272 B1* | 10/2015 | Rausch | G11B 7/1267 |
| 2011/0205861 A1 | 8/2011 | Erden et al. | |
| 2011/0228651 A1* | 9/2011 | Gage | G11B 5/314 369/13.24 |
| 2015/0332725 A1* | 11/2015 | Rausch | G11B 7/1263 369/13.26 |

OTHER PUBLICATIONS

File History for U.S. Appl. No. 14/666,557.

* cited by examiner

*Primary Examiner* — Ali Neyzari

(74) *Attorney, Agent, or Firm* — Hollingsworth Davis, LLC (57) ABSTRACT

During field operation of a heat-assisted magnetic recording data storage device, a laser adjustment procedure is repeatedly performed. The laser adjustment procedure involves writing, at a designated location on a recording medium at least three tracks at an unsqueezed pitch, a first track being in the middle of the at least three tracks. A first bit error rate of the first track is compared with a reference bit error rate. In response to the comparison satisfying a threshold, the laser current is swept while recording squeezed test tracks at the designated location to determine a new laser current that results in a minimum bit error rate. The new laser current is used for subsequent write operations.

20 Claims, 7 Drawing Sheets

LASER ADJUSTMENT DURING FIELD OPERATION OF A HEAT-ASSISTED MAGNETIC RECORDING DATA STORAGE DEVICE

SUMMARY

The present disclosure is directed to determining optical degradation in a heat-assisted read/write head. In one embodiment, during field operation of a heat-assisted magnetic recording data storage device, a laser adjustment procedure is repeatedly performed. The laser adjustment procedure involves writing, at a designated location on a recording medium at least three tracks at an unsqueezed pitch, a first track being in the middle of the at least three tracks. A first bit error rate of the first track is compared with a reference bit error rate. In response to the comparison satisfying a threshold, the laser current is swept while recording squeezed test tracks at the designated location to determine a new laser current that results in a minimum bit error rate. The new laser current is used for subsequent write operations.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the paramagnetic effect.

A laser or other energy source may be directly (e.g., surface-attached) or indirectly (e.g., via optical fiber) coupled to a HAMR read/write head. An optical path (e.g., waveguide) is integrated into the read/write head and delivers the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head). The NFT may also be referred to as a plasmonic transducer, plasmonic antenna, near-field antenna, nano-disk, nano-patch, nano-rod, etc.

Generally, the NFT is formed by depositing thin-film of material such as gold, silver, copper, etc., a region of near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium.

Due to the intensity of the laser light and the small size of the NFT, the NFT and surrounding material are subject to a significant rise in temperature during writing. Over time, this can affect integrity of the NFT, for example, causing it to become misshapen. Other events, such as contact between the read/write head and recording medium, contamination, etc., may also degrade the operation of the NFT, the laser, and nearby optical components. Degradation of the NFT and other components will affect the effective service life of a HAMR read/write head. In view of this, methods and apparatuses described herein the determine the effectiveness of the read/write head has been affected/changed by the quality of the NFT (and other optical elements) and attempt to mitigate negative impacts on drive performance caused by the changes.

Figure 1:
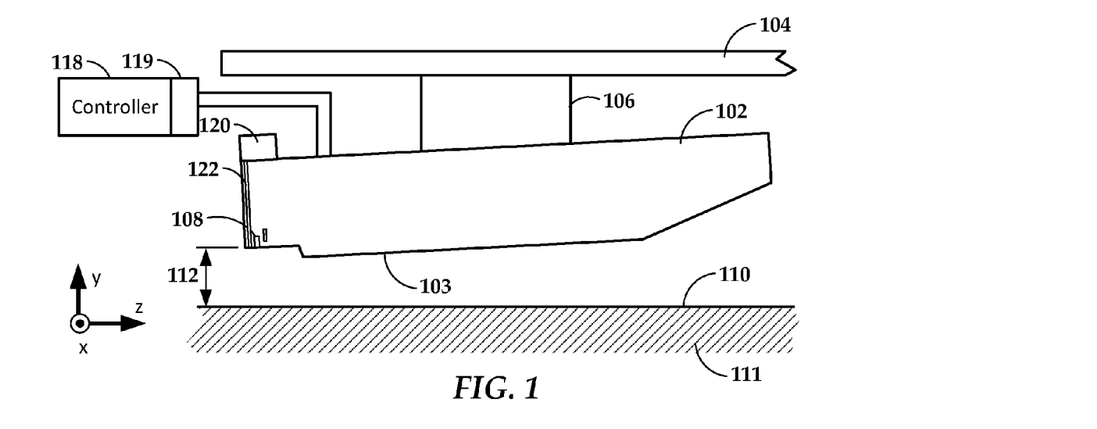
FIG. 1 is a block diagram of a hard disk drive slider and media arrangement according to an example embodiment.

In reference now to FIG. 1, a block diagram shows a side view of a read/write head 102 according to an example embodiment. The read/write head 102 may be used in a magnetic data storage device, e.g., HAMR hard disk drive. The read/write head 102 may also be referred as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

A controller 118 is coupled to the read/write transducers 108, as well as other components of the read/write head 102, such as heaters, sensors, etc. The controller 118 may be part of general- or special-purpose logic circuitry that controls the functions of a storage device that includes at least the read/write head 102 and recording medium 111. The controller 118 may include or be coupled to a read/write channel 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hot spot on the recording medium 111 near the read/write transducer 108. These components include laser 120 (or other energy source) and waveguide 122. The waveguide 122 delivers light from the laser 120 to components near the read/write transducers 108. These components are shown in greater detail in FIG. 2, which is a block diagram illustrating a cross-sectional view of the read/write head 102 according to an example embodiment.

Figure 2:
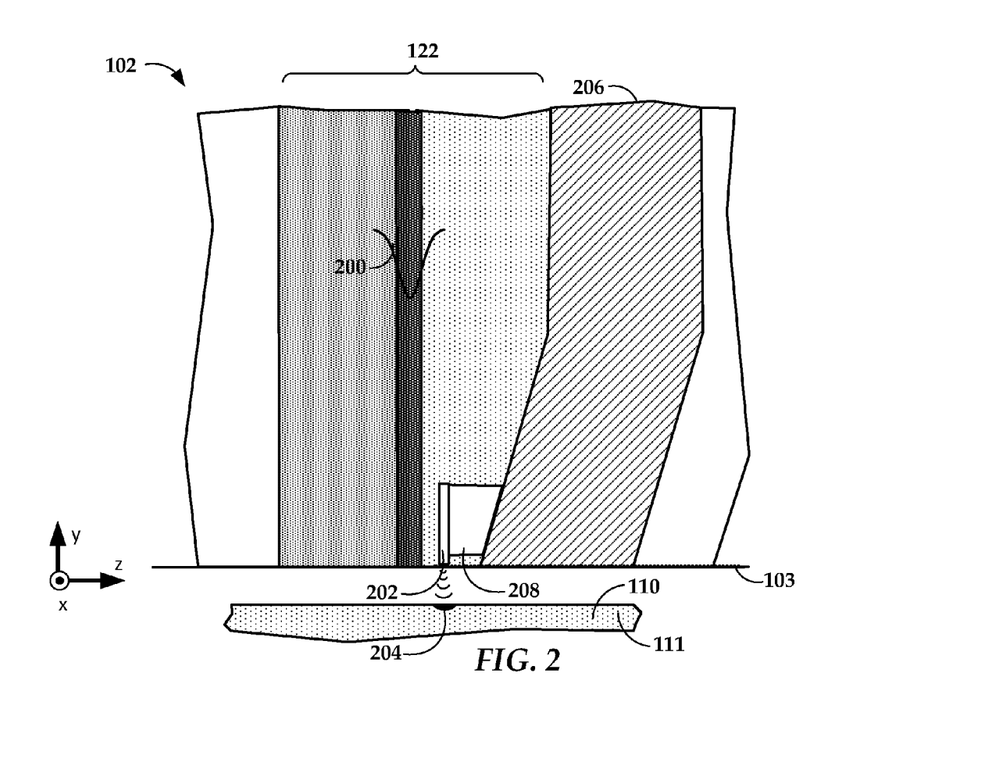
FIG. 2 is a cross-sectional view of a read/write head according to an example embodiment.

As shown in FIG. 2, the waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The energy 200 applied to the near-field transducer 202 to create the hotspot 204 can cause a significant temperature rise in a local region near the media-facing surface 103. The near-field transducer 202 may include a heat sink 208 that draws away some heat, e.g., to the write pole 206 or other nearby heat-conductive component. Nonetheless, the temperature increase near the near-field transducer 202 can be significant, leading to degradation of the near-field transducer 202 and other components over time. As such, methods and apparatuses described herein facilitate determining the quality of an NFT and/or related optical components.

Generally, a method involves examining measurable effects that may be indicative of a reduction in quality of the NFT and other optical components. In HAMR drives, the performance of the write transducer tends to change over time. This is suspected as being due at least to a change in the performance of the NFT. The NFT performance changes may be caused, e.g., by material deformation, excess heating, layer separation, contamination, etc. When these changes occur, the NFT efficiency can improve or worsen. This can lead to problems when the head writes data to the disk. For example, the bit-error-rate (BER) encountered when reading back the recorded data can change over time, an increase in BER being undesirable. This may be caused, e.g., by a loss of efficiency that reduces the size of the hotspot during recording.

In other situations, the track width can increase due to a change in the size of the hotspot. This can be caused by the NFT becoming more efficient when the same laser current is applied. This may also be caused without a change in efficiency, e.g., by a widening of the illumination pattern of the NFT onto the media due to a change in NFT shape. Cross-track enlargement of the hotspots can corrupt existing data on adjacent tracks. Adjacent tracks may also be corrupted if the track width is the same but misaligned in the crosstrack direction (e.g., due to change in NFT shape), causing data being written too far off track center.

Another effect that may be seen due to a change in the NFT relates to the maintenance of head-to-media spacing. Generally, a read/write head may use a heater to finely control head-to-media spacing (HMS). The heater causes a local thermal expansion at the ABS near the read and/or write transducer, thereby varying the effective HMS between the transducers and the recording medium. The heat generated at or near the NFT contributes to thermal expansion at the ABS. This is referred to as laser-induced write protrusion (LIWP). A change in NFT efficiency can change LIWP, and so may be detected by a change in net heater power needed to induce contact and/or maintain a desired HMS.

In some cases, the laser itself may manifest a change in performance over time, such as emitting lower power levels for a particular input current. The effects of laser efficiency changes may be similar in some aspects to NFT degradation, such as changes in HMS, changes in hotspot size, etc. In some cases, laser degradation may be diagnosed using other sensors (if available), such as a photodetector. Nonetheless, mediation of either laser or NFT/optical degradation may be the same, e.g., adjustment of laser current.

In order to maintain an optimum performance in view of NFT degradation (and/or degradation of the laser and other optical components) a controller may utilize a laser field adjust (LFA) algorithm to monitor and adjust the HAMR recording parameters at least related to laser power. The LFA algorithm includes a self-monitor trigger system that detects changes in recording performance as described above (e.g., increase in BER, increase in adjacent track erasure or interference). The LFA may select an optimum laser operating current using the same thresholds as a laser calibration algorithm employed in the factory. This may help maintain consistency in certain parameters such as adjacent track interference, encroachment, track width etc., such that a servo control system can still operate within limits. When applicable, a transfer function can be used to convert the factory threshold into the LFA threshold in order to save execution time in the field.

As noted above, when the optical efficiency of the read/write head changes over time, the LIWP needs to be accounted for. The majority of the change in LIWP would come from what may be referred to as local LIWP, which is a protrusion local to an ABS area immediately surrounding the NFT region. The local LIWP may induce a significant protrusion over a small area and have a relatively short time constant. In contrast, broad LIWP is caused by heat transfer over a larger area of the read/write head. The broad LIWP has a relatively small effect on protrusion over this larger region, and generally with a longer time constant. Even though changes in NFT may primarily affect local LIWP, the local LIWP may be estimated based on the global protrusion, which is a combination of heater protrusion and LIWP (and may include other sources of heat, such as the write pole). The embodiments described below may also include adjustments to fly height in response to detecting optical component degradation.

Figure 3A:
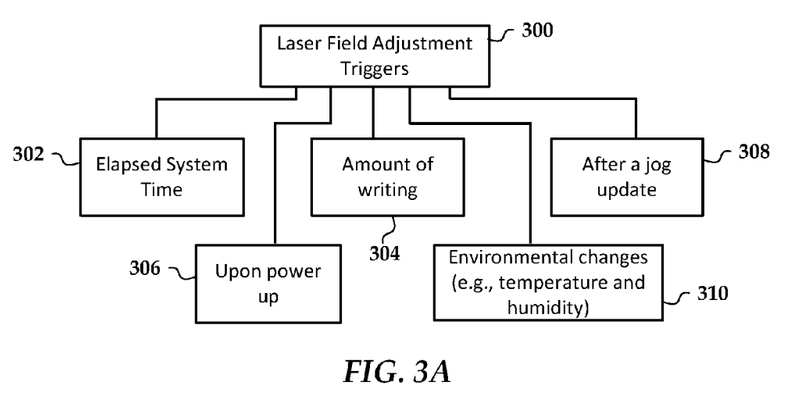
FIG. 3A is a block diagram illustrating trigger events that may begin an adjustment procedure according to an example embodiment.
Figure 3B:
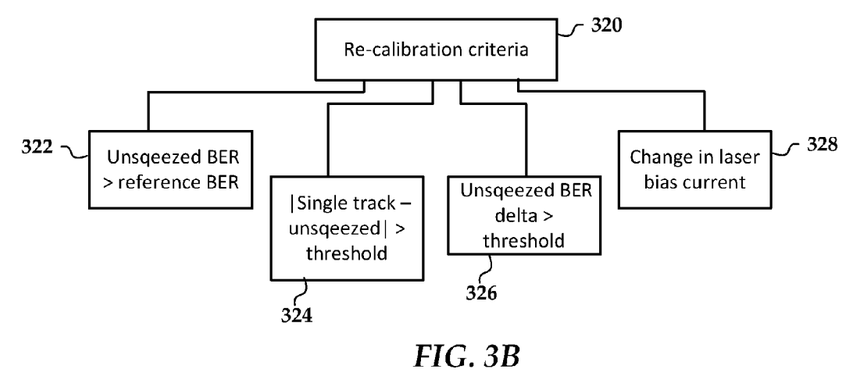
FIG. 3B is a block diagram illustrating measurements that may be performed in response to trigger events according to an example embodiment.

In FIG. 3A, a block diagram illustrates events that may serve as triggers 300 to begin an LFA procedure according to an example embodiment. Generally, the system will periodically check to determine whether or not the NFT has changed performance. The periodicity of these checks may depend on initial factory data on how dynamic the characteristics of the NFT design are. In response to the trigger, the procedure will measure the BER under one or more conditions as described below, as well as optionally testing laser current values (e.g., bias current). If the measurements meet a threshold as shown in FIG. 3B, remedial action can be taken. Any combination of the triggers shown in FIG. 3A may be used to initiate the additional testing.

As shown in FIG. 3A, one trigger may include elapsed system time 302, e.g., measured in hours. An amount of writing 304 may trigger a BER/laser check. The amount of writing 304 may be measured using any combination of time spent writing, number of writes, amount of data written, etc. A power up 306 may trigger a BER/laser check. The power up 306 may include the application of power from a power-off state, or a soft reset of the system.

A jog update 308 may trigger a BER/laser check. Generally, a jog update 308 occurs in response to determining that tracks have been written off-center from where the read/write head is positioned based on servo settings that define track center. This can be caused by the NFT becoming misshapen, and one option for correction is to update the servo settings to add an offset, or jog, when writing track center. This jog may only be applied during writes and not reads, due to the effect likely being due to the optical components. This may also be a sign that there is a change in NFT efficiency, thus can trigger the BER/laser check.

Another example trigger shown in FIG. 3A is an environmental change 310. This change 310 may include a long-term trend in ambient conditions such as temperature, humidity, vibration, etc. The change 310 may also include short term events that may affect system performance, e.g., temperature exceeding a threshold, even if for a short time, shock events, etc. Sensors located on the storage device (e.g., accelerometers, thermal sensors) can provide the data used for this triggering event 310.

After the triggering event occurs, a measurement occurs, and criteria derived from the measurements may be used cause a recalibration of the laser. In FIG. 3B, a block diagram illustrates criteria 320 according to an example embodiment. These criteria 320 will provide data that indicates whether or not remedial action is necessary, and may also provide indicators of what remedial action is needed.

Generally, the measurements 320 may involve BER measurements and laser measurements. The BER measurements may include isolated, single track BER and unsqueezed BER. An explanation of these BER measurements is made with reference to the block diagram of FIG. 4A. This figure illustrates three adjacent tracks 402-404 are shown written at a nominal center-to-center track distance/pitch 406. An isolated, single track BER measurement involves writing a single track, e.g., track 403, without surrounding tracks 402 and 404. The surrounding region may be erased (e.g., set to a single magnetic orientation) or may have a random magnetic orientation. Generally, reading back this track provides an estimation of BER without the effects of adjacent track interference.

Figure 4A:
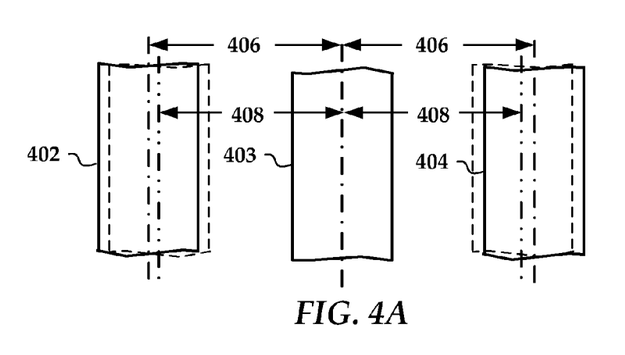
FIG. 4A is a block diagram illustrating measurement of bit error rate at different track pitch according to an example embodiment.

An unsqueezed (or zero-squeezed) BER measurement involves writing all three tracks 402-404 at the nominal pitch 406 and reading back the BER of the center track 403. Generally this provides an estimate of current performance under controlled conditions. Note that the nominal pitch 406 may be radial-zone-specific, and so may be different for different regions of the disk.

A squeezed BER measurement involves writing the outer tracks 402, 404 at a reduced, or squeezed, track pitch 408. The squeezed pitch 408 may be expressed as ratio of the nominal pitch 406. For example, n % squeezed indicates (1−n/100) *nominal_pitch, so 5% squeezed would indicate that the pitch between a center test track and tracks on either side is 0.95 of nominal. Generally, the altered track pitch may be implemented by adding/subtracting a delta value from the servo input which moves the head to the current track center. The servo inputs are integer numbers input to a digital-to-analog converter (DAC). Decreasing the track pitch will tend to increase BER if the optical components (e.g., laser, NFT) haven't changed. If the optical components have changed, then the intrinsic track width may capable of being smaller than before. In such a case, some amount of squeeze may be applied before an increase in BER is seen.

In reference again to FIG. 3B, one BER criteria that may be used to initiate a LFA calibration is shown in block 322, where the unsqueezed BER is some amount higher than the reference BER on the same zone. The reference BER may be maintained for each zone (e.g., measured beforehand, e.g., in the factory and during use). The reference BER may change over time, Another criteria is shown in block 324, where a difference between the isolated, single track and unsqueezed BER is greater than a threshold amount. This may indicate an increase in track width that is causing significant adjacent track interference. Another criteria is shown in block 326, where unsqueezed BER is greater than a global threshold value for the data storage device. Note that in this case, the threshold need not be measured as in case 322, but may be some absolute reference value that is set for the entire device, e.g., beyond what is considered acceptable for all zones, or a globally applied zone-dependent and/or age-dependent function that does not vary based on particular performance of zones or regions. It should be noted that any of the criteria 324, 324, 326 may also be varied to use a squeezed BER measurement instead of unsqueezed BER.

An optional criteria is shown in block 328, which indicates a change in laser bias current is needed or has been performed. Generally, a laser may have a bias applied during a write mode where the head is currently not writing data (e.g., while traversing servo marks). This is considered a partially active mode, and allows the laser to more quickly transition to active mode where the laser outputs sufficient light to heat the media. The laser current used to set partially-active mode may be occasionally adjusted by measuring the laser light output using, for example, a photodetector. The measurement of the laser light output is used to determine an adjusted laser input current that ensures consistent laser light output in the active mode.

Figure 4B:
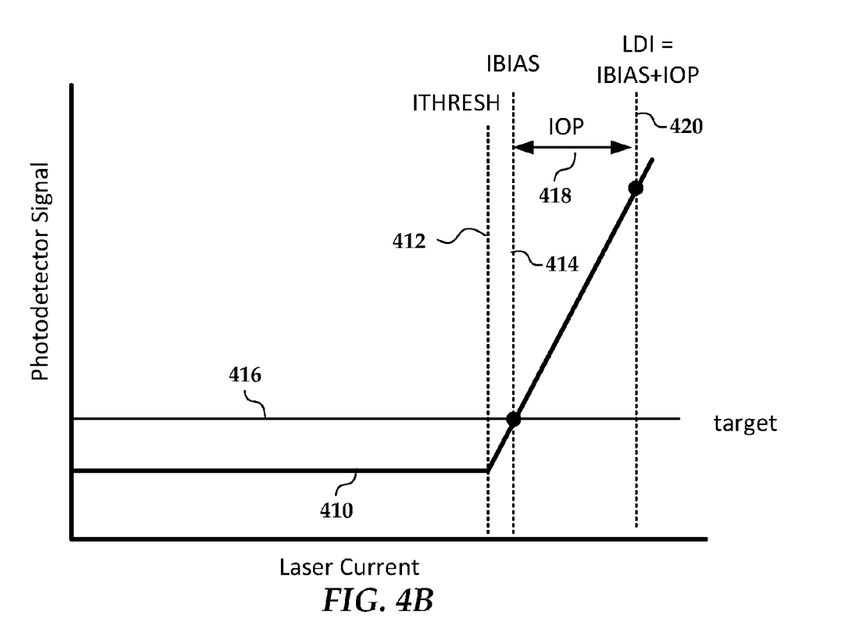
FIG. 4B is a diagram illustrating laser bias current according to an example embodiment.

Curve 410 in FIG. 4B shows an example relationship between laser input current and the photodetector signal, which is a measure of laser light output. It will be understood that other sensors may be used to detect laser output power, e.g., thermal sensor. At current levels below ITHRESH 412, there is negligible laser output because the applied current is insufficient to induce lasing and thus emit light from the laser. At current levels of ITHRESH 412 or greater, the laser begins to emit light. At a partially-active current level IBIAS 414, the laser is in the partially-active mode, and the measured light output at this value is defined as PD target 416.

Generally, PD target 416 is a predefined operational point that sets the desired light output during partially-active mode. The value of IBIAS 414 may be adjusted to maintain this operational point, e.g., due to changes in the laser over time. If the value set for IBIAS 414 during this adjustment passes a threshold, then this may be a criterion for recalibration as indicated in block 328, e.g., as this indicates a significant change in laser characteristics. For example, a baseline value may be set at factory initialization, and if IBIAS is adjusted by >10% of this value, then the laser recalibration described below (which affects IOP) may commence. This adjusted value of IBIAS that exceeded the threshold is then set as the new baseline.

Figure 5:
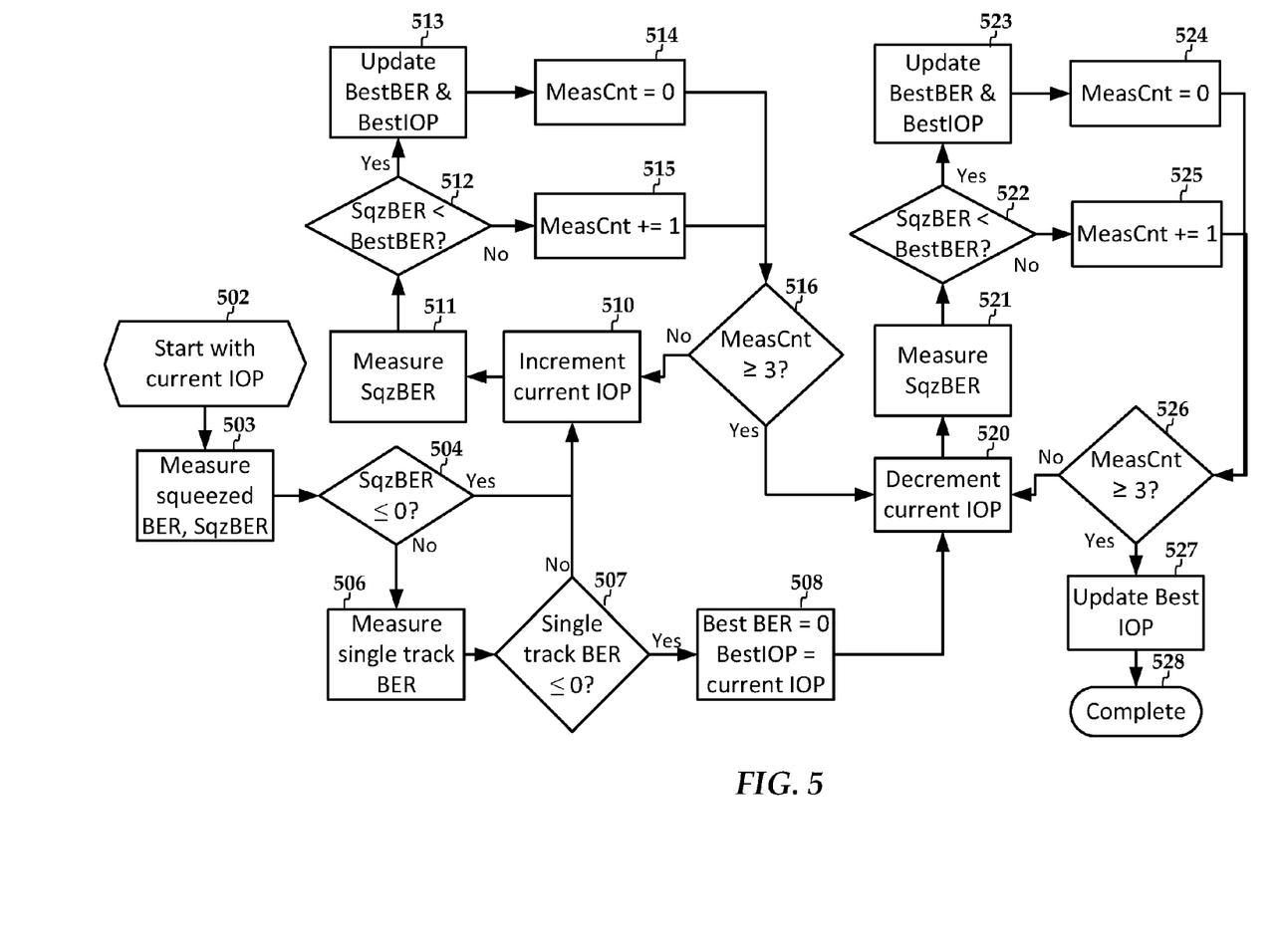
FIG. 5 is a flowchart illustrating a method according to an example embodiment.

If one or more of the threshold conditions shown in FIG. 3B are determine, then LFA recalibration is performed. An example of this recalibration is shown in the flowchart of FIG. 5. The recalibration starts 502 with a currently-used value of laser current (current IOP) as well as a reference value of BER (BestBER). The BestBER value may be region-specific, and may be set and modified at known good states of the device (e.g., factory calibration, after field recalibration), with the understanding that the value may increase with age of the device. A measurement 503 of squeezed BER is made and tested 504 to see if it meets a threshold, e.g., less than or equal to zero. In this case the BER is expressed as a logarithmic coefficient, and so less than zero indicates a ratio of less than one. The amount if squeeze is selected so that under normal operating conditions, the squeezed BER would be greater than or equal to this threshold. Other thresholds, may be used, e.g., −0.5, −1.0, etc.

If the squeezed BER is less than the threshold, then it is possible the optical efficiency of the read/write head has changed. In such a case (returning "yes" from block 504), a sweep is performed as shown in blocks 510-516, which will be described in greater detail below. However, if the squeezed BER is greater than the threshold (returning "no" from block 504), then isolated, single track BER is measured 506 and tested 507. A BER of zero is used for this test, although other thresholds may be used. If single track BER is greater than the threshold, then this could also be a sign of loss in optical efficiency, e.g., spot size too small or off-center. In such a case (test 507 returns "no"), then the sweep 510-516 is performed. If the single track BER is below the threshold, BestBER is set to a default value and the BestIOP is set 508 to the current value.

As noted above, if a low squeezed BER was found or both high squeezed BER and high, isolated, single track BER was found, then a sweep 510-516 is performed, which begins by incrementing 510 the current value of IOP. The squeezed BER is measured 511 and compared 512 to the best BER previously found. If the squeezed BER is high (block 512 returns "no"), then a counter is incremented 515. The counter is tested at block 516 to determine whether the sweep has been performed at least three times (some other number may be used) with block 512 returning "no." This attempts to find the lowest point on the squeezed BER versus laser current curve (see discussion of FIG. 7 below).

If squeezed BER is low (block 512 returns "yes"), then the BestIOP value is updated 513 with the current IOP value and the counter is set to zero 514. The BestBER value is also updated with the squeezed BER value. Generally, this will cause the BestIOP value to be set to value associated with the lowest BER found in the sweep. After the sweep 510-516 is complete, a negative sweep 520-526 is performed. The negative sweep 520-526 is analogous to the sweep 510-516, except that the IOP is decremented instead of being incremented. If the sweep 520-526 finds no improvement in BER, then the values of BestBER and BestIOP are unchanged from the previous sweep 510-516.

After the negative sweep 520-526 the BestIOP is updated 527 to the new optimum value found in the sweeps (if any), after which the calibration is complete 528. After the calibration, any reference tracks used are updated (e.g., rewritten) using the new IOP value, and the reference BER is updated to the BestBER value. The BestBER may be checked against a reference value, and if exceeds a threshold (e.g., a global BER threshold), a user warning may be issued. For example, a Self-Monitoring, Analysis and Reporting Technology (S.M.A.R.T.) warning message may be sent to the host indicating an increased risk of data loss.

It should be noted that variations are possible in the procedure shown in FIG. 5. For example, instead of using squeezed track measurements, e.g., at blocks 503, 511, and 521, unsqueezed track measurements may be used for in place of one or more of the squeezed measurements. In another variation, the count variable that performs additional overshoot measurements that are tested at blocks 516 and 526 may be set to different values.

The LFA calibration test may be performed on tracks reserved for Heath Head Self Assessment Test (H2SAT). Generally, H2SAT uses small test regions distributed throughout the disk. Using these regions for LFA calibration may involve some changes to the H2SAT track, such as increasing the number of tracks per zone, and further increasing the number of zones used to run the calibration. One of the zones may be used to store the reference BER data. One zone may be used to store the ambient BER data and another zone may be used to store the hot BER data. The remaining zones are used to optimize the laser. These IOP found in these zones are used to derive zone-specific baseline laser currents.

Figure 6:
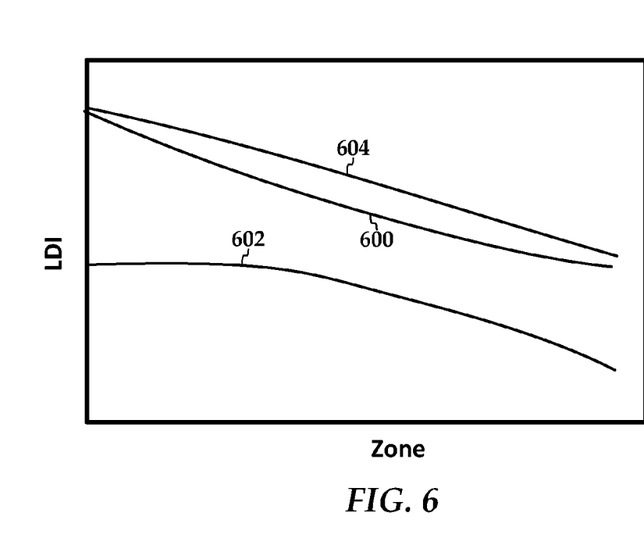
FIG. 6 is a graph showing results of a laser recalibration according to an example embodiment.
Figure 7:
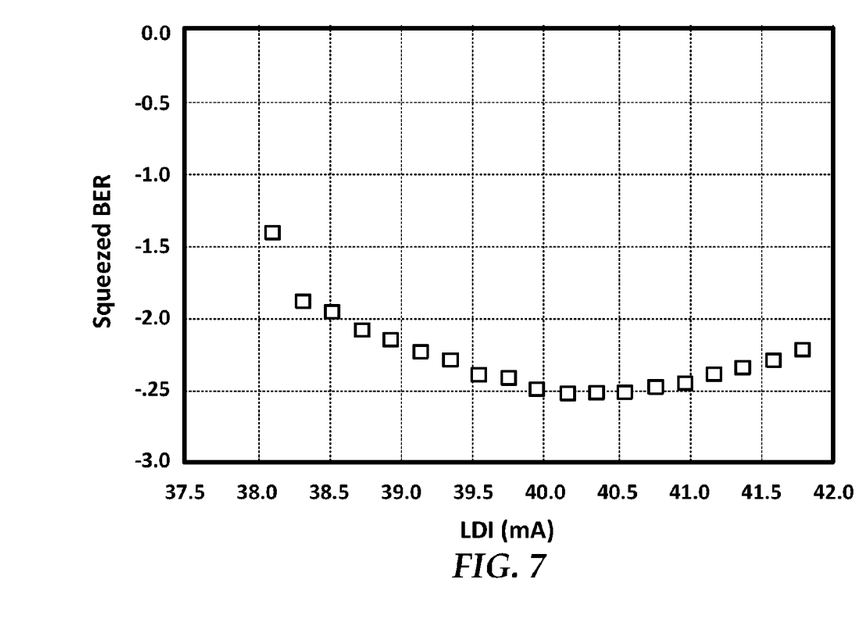
FIG. 7 is a graph shows an example of how laser current can affect squeezed bit error rate during a calibration according to an example embodiment.

In FIG. 6, a graph shows test results using the laser recalibration as described above. Curve 600 represents an initial current profile for a laser across a number of disk zones at a first time. At a second time, the recalibration procedure was run and current profile 602 was selected by the procedure. This suggests that there was an increase in optical efficiency between the first and second times. The recalibration was run at a third time, resulting in current profile 604. This suggests that there was a decrease in optical efficiency between the second and third times. In FIG. 7, a graph shows an example of how laser current can affect squeezed BER during a calibration as described herein. The forward and reverse sweeps described in FIG. 5 will find a current at or near the low point of the curve shown in FIG. 7.

Figure 8:
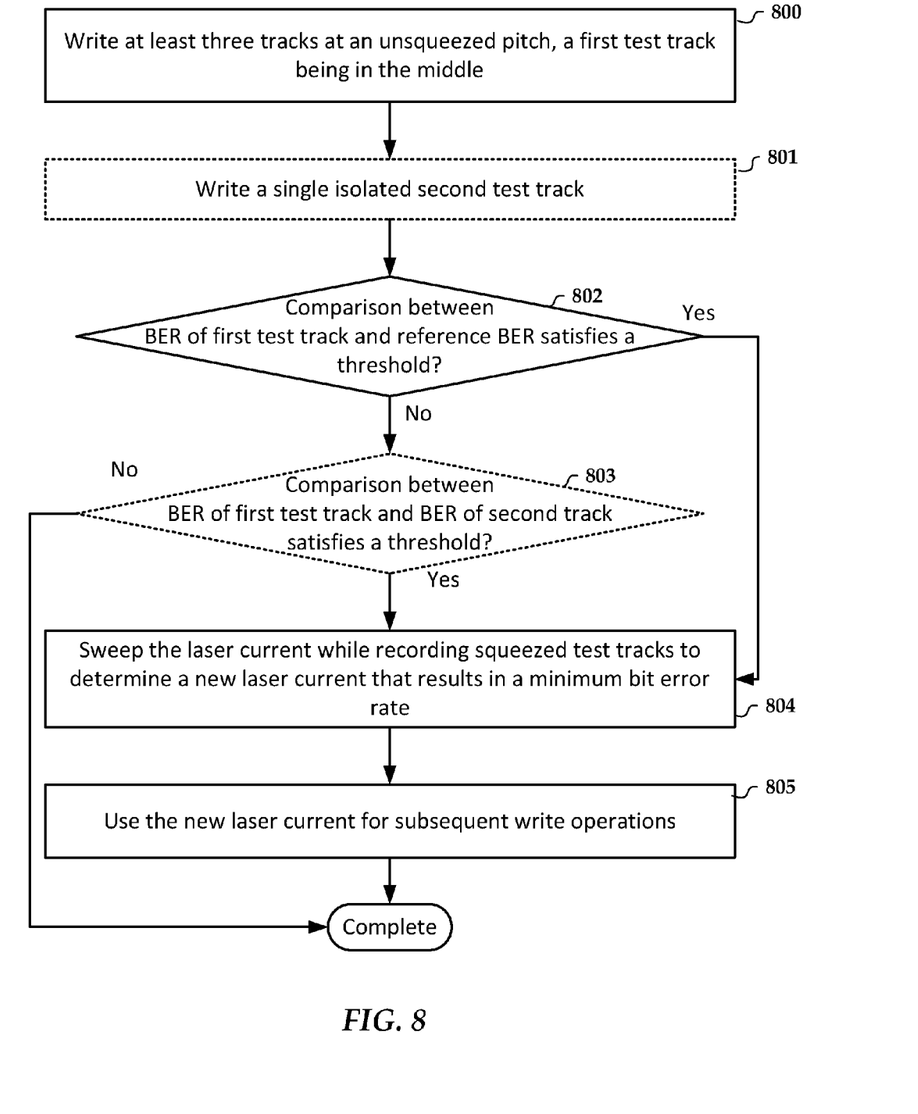
FIG. 8 is a flowchart of a method according to an example embodiment.

In FIG. 8, a flowchart illustrates an example of a method according to an example embodiment. Generally, the method is repeatedly performed at least during field operation of a heat-assisted magnetic recording data storage device. The method involves (using a current setting of laser current), writing 800 at a designated location on a recording medium, at least three test tracks at an unsqueezed pitch, a first test track being in the middle of the at least three tracks. Optionally, a single isolated second test track is written 801. A first bit error rate of the first track is compared 802 with a reference bit error rate, and optionally the first bit error rate is compared 803 with a second bit error rate of the second track. In response to at least one of the comparisons 802, 803 satisfying a threshold, the laser current is swept 804 while recording squeezed test tracks at the designated location to determine a new laser current that results in a minimum bit error rate. The new laser current is used 805 for subsequent write operations.

Figure 9:
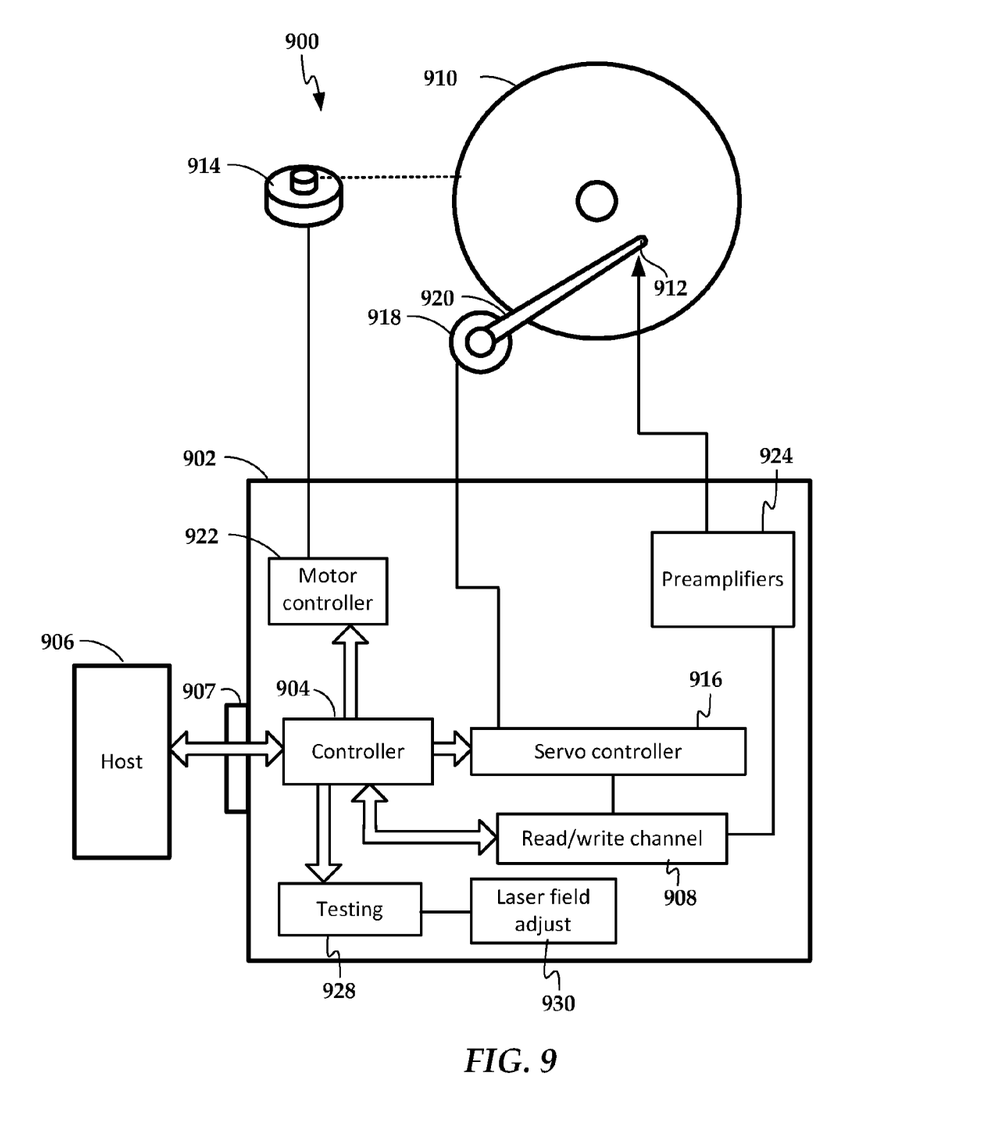
FIG. 9 is a block diagram of an apparatus and system according to an example embodiment.

In reference now to FIG. 9, a block diagram illustrates components of system 900 according to an example embodiment. The system 900 includes a HAMR hard drive apparatus 902 having to one or more read/write heads 912. The apparatus 902 includes a controller 904 that controls a number of functions of the system 900, optionally including communications between the apparatus 902 and a host device 906 via a host interface 907. The host device 906 may include any electronic device that can be communicatively coupled to communicate with the apparatus 902, e.g., a general-purpose computer, a factory test bench, remote terminal, etc.

The controller 904 may include any combination of custom logic circuits, application specific integrated circuits (ASICs), general-purpose central processing unit (CPU), interface circuits, and may utilize instructions stored as firmware and/or software. The controller 904 may read data from and write data to a recording medium (e.g., disk 910) via a read/write channel 908. The controller 904 may, among other things, determine a location on the disk 910 for the desired data, move the heads to the location (track) of the data, read or write the data via the read/write channel 908, correct errors, transfer the data to/from the host 906, etc.

The read/write channel 908 converts data between the digital signals processed by the data controller 904 and the analog signals conducted through read/write heads 912. The read/write channel 908 also provides servo data read from the disk 910 to a servo controller 916. The servo controller 916 uses these signals to drive an actuator 918 (e.g., voice coil motor) that rotates an arm 920, upon which the read/write heads 912 are mounted. The heads 912 are moved radially across different tracks of the disk(s) 910 by the actuator motor 918 (e.g., voice coil motor), while a spindle motor 914 rotates the disk(s) 910. A microactuator (not shown) may also be included to provide finer tracking control, and also receives inputs from the servo controller 916. The controller 904 controls the spindle motor 914 by way of a motor controller 922.

During write operations, the read/write channel 908 provides analog signals that are delivered to the read/write heads 912 by way of a preamplifier section 924. The preamplifier section 924 amplifies and conditions the write signals sent to write coils of the read/write heads 912. In the illustrated embodiment, the preamplifier 924 section also includes circuitry that energizes a laser (or other energy source) at each of the read/write heads 912 during write operations. The laser preamplifier conditions the signals to ensure the lasers provide sufficient energy to heat a spot on the disk 910 as it is being recorded. The preamplifier section 924 also includes circuitry that amplifies and conditions recorded data signals received from the read/write heads 912 for decoding via the read/write channel 908. Other signals sent to or received from the read/write head 912 may also be conditioned via the preamplifier, such as heater control signals, sensor signals, etc.

A testing module 928 may perform in-use data collection and offline testing as described above. For example, the testing module may monitor triggers as shown in FIG. 3A to determine whether to test BER values as described above. As indicated by laser field adjust module 930, these triggers may cause testing of the BER values on test tracks and compare to, e.g., a reference track, threshold values, squeezed versus single-track BER, etc. In response, the laser output power may be adjusted to achieve target BER values, e.g., as shown in FIG. 5. This testing may be repeated for each of the read/write heads 912, and may be performed at multiple zones spread across the disk(s) 910. The testing may result in new values of region-specific reference BER and laser current to be stored in persistent memory to be used during subsequent operation and subsequent tests.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   during field operation of a heat-assisted magnetic recording data storage device, repeatedly performing a laser adjustment procedure, the laser adjustment procedure comprising:
      using a current setting of laser current, writing, at a designated location on a recording medium, at least three test tracks at an unsqueezed pitch, a first test track being in the middle of the at least three tracks;
      comparing a first bit error rate of the first track with a reference bit error rate; and
      in response to the comparison satisfying a threshold, sweeping the laser current while recording squeezed test tracks at the designated location to determine a new laser current that results in a minimum bit error rate, and using the new laser current for subsequent write operations.

2. The method of claim 1, wherein the reference bit error rate is specific to the designated location.

3. The method of claim 2, further comprising updating the reference bit error rate for the designated location with a new bit error rate found using the new laser current.

4. The method of claim 1, wherein the reference bit error rate is global to the data storage device.

5. The method of claim 1, further comprising writing a second isolated single test track at the designated location, the sweeping of the laser occurring in response to both the comparison satisfying the threshold and second comparison between the first bit error rate of the first test track and a second bit error rate of the second test track satisfying a second threshold.

6. The method of claim 1, wherein the sweeping of the laser occurring in response to both the comparison satisfying the threshold and an adjustment to a laser bias current having exceeded a second threshold.

7. The method of claim 1, wherein sweeping the laser current while recording the squeezed test tracks comprises increasing the laser current during a first series of sweeps to find a first minimum bit error rate, and then decreasing the laser current during a second series of sweeps to determine whether a second bit error rate is found lower than the first minimum bit error rate.

8. The method of claim 1, wherein the laser adjustment procedure is triggered by at least one of:
   the storage device having been used for at least a predefined time period;
   the storage device having been used for at least a threshold number of write operations;
   the storage device being powered up;
   a servo update used to compensate for a reader-to-writer offset; and
   an environmental change.

9. A method, comprising:
   during field operation of a heat-assisted magnetic recording data storage device, repeatedly performing a laser adjustment procedure, the laser adjustment procedure comprising:
   using a current setting of laser current, writing, at a designated location on a recording medium, a first isolated single test track and at least test three tracks at an unsqueezed pitch, a second test track being in the middle of the at least three tracks;
   comparing a first bit error rate of the first test track with a second bit error rate of the second test track; and
   in response to the comparison satisfying a threshold, sweeping the laser current while recording squeezed test tracks at the designated location to determine a new laser current that results in a minimum bit error rate, and using the new laser current for subsequent write operations.

10. The method of claim 9, further comprising making a second comparison between the second bit error rate and a reference bit error rate specific to the designated location, the sweeping of the laser occurring in response to both the comparison satisfying and the second comparison satisfying a second threshold.

11. The method of claim 10, further comprising updating the reference bit error rate for the designated location with a new bit error rate found using the new laser current.

12. The method of claim 9, wherein the sweeping of the laser occurs in response to both the comparison satisfying the threshold and an adjustment to a laser bias current having exceeded a second threshold.

13. The method of claim 9, further comprising making a second comparison between the second bit error rate and a global bit error rate for the data storage device, the sweeping of the laser occurring in response to both the comparison satisfying and the second comparison satisfying a second threshold.

14. The method of claim 9, wherein sweeping the laser current to while recording the squeezed test tracks comprises increasing the laser current during a first series of sweeps to find a first minimum bit error rate, and then decreasing the laser current during a second series of sweeps to determine whether a second bit error rate is found lower than the first minimum bit error rate.

15. An apparatus, comprising:
   a preamplifier section configured to communicate with a read/write head of a heat-assisted magnetic recording data storage device; and
   and a controller configured to, during field operation of the apparatus, repeatedly perform a laser adjustment procedure via the preamplifier section, the laser adjustment procedure comprising:
   using a current setting of laser current, writing, at a designated location on a recording medium, a first isolated single test track and at least three tracks at an unsqueezed pitch, a second track being in the middle of the at least three tracks;
   making a first comparison between a first bit error rate of the first track with a second bit error rate of the second track;
   making a second comparison between the second bit error rate and a reference bit error rate; and
   in response to the comparison satisfying a threshold, sweeping the laser current while recording squeezed test tracks at the designated location to determine anew laser current that results in a minimum bit error rate and using the new laser current for subsequent write operations.

16. The apparatus of claim 15, wherein the reference bit error rate is specific to the designated location, the laser adjustment procedure further comprising updating the reference bit error rate for the designated location with a new bit error rate found using the new laser current.

17. The apparatus of claim 15, wherein the reference bit error rate is global to the data storage device.

18. The apparatus of claim 15, wherein sweeping the laser current to while recording the squeezed test tracks comprises increasing the laser current during a first series of sweeps to find a first minimum bit error rate, and then decreasing the laser current during a second series of sweeps to determine whether a second bit error rate is found lower than the first minimum bit error rate.

19. The apparatus of claim 15, wherein the sweeping of the laser occurs in response to both the comparison satisfying the threshold and an adjustment to a laser bias current having exceeded a second threshold.

20. The apparatus of claim 15, wherein the laser adjustment procedure compensates for degradation of a near-field transducer of the read/write head.

\* \* \* \* \*